US008417833B1

(12) United States Patent  
Amdahl

(10) Patent No.: US 8,417,833 B1
(45) Date of Patent: Apr. 9, 2013

(54) METACODEC FOR OPTIMIZING NETWORK DATA COMPRESSION BASED ON COMPARISON OF WRITE AND READ RATES

(75) Inventor: Saxon Carl Amdahl, Los Gatos, CA (US)

(73) Assignee: F5 Networks, Inc., Seattle, WA (US)

( * ) Notice: Subject to any disclaimer, the term of this patent is extended or adjusted under 35 U.S.C. 154(b) by 601 days.

(21) Appl. No.: 11/564,805

(22) Filed: Nov. 29, 2006

(51) Int. Cl.
 *G06F 15/16* (2006.01)
 *G06F 13/00* (2006.01)
 *G06F 13/28* (2006.01)
 *H04F 12/28* (2006.01)

(52) U.S. Cl. ........ 709/247; 370/389; 711/167; 711/168; 711/169; 711/170; 711/171; 711/172; 711/173

(58) Field of Classification Search .................. 370/389; 709/247; 711/167–173
See application file for complete search history.

(56) References Cited

U.S. PATENT DOCUMENTS

| 4,021,782 | A | 5/1977 | Hoerning |
| 4,054,951 | A | 10/1977 | Jackson et al. |
| 4,316,222 | A | 2/1982 | Subramaniam |
| 4,386,416 | A | 5/1983 | Giltner et al. |
| 4,593,324 | A | 6/1986 | Ohkubo et al. |
| 4,626,829 | A | 12/1986 | Hauck |
| 4,701,745 | A | 10/1987 | Waterworth et al. |
| 4,862,167 | A | 8/1989 | Copeland, III |
| 4,876,541 | A | 10/1989 | Storer |
| 4,890,282 | A | 12/1989 | Lambert et al. |
| 4,891,643 | A | 1/1990 | Mitchell et al. |
| 4,897,717 | A | 1/1990 | Hamilton et al. |
| 4,906,991 | A | 3/1990 | Fiala et al. |
| 4,937,844 | A | * 6/1990 | Kao .............................. 375/240 |
| 4,971,407 | A | 11/1990 | Hoffman |

(Continued)

FOREIGN PATENT DOCUMENTS

| EP | 0 929 173 A2 | 7/1999 |
| EP | 0 947 104 B1 | 11/2002 |

(Continued)

OTHER PUBLICATIONS

Cheng, J.M., et al. "A fast, highly reliable data compression chip and algorithm for storage systems," IBM, vol. 40, No. 6, Nov. 1996, 11 pgs.

(Continued)

*Primary Examiner* — Alina N Boutah  
*Assistant Examiner* — Clarence John  
(74) *Attorney, Agent, or Firm* — Frommer Lawrence & Haug LLP; John W. Branch

(57) ABSTRACT

A method, system, and apparatus are directed towards selectively compressing data for transmission over a network. In one embodiment, a sending network device and receiving network device negotiates different compression modes to communicate data between them. An initial compression mode may be selected based on a network bandwidth. The sending network device then reads data, and compresses using the selected compression mode. The compressed data may then be written out. Ratios of compression and the write times are then employed to selectively adjust the compression mode for subsequent data compressions. In one embodiment, a compression ratio is also employed to determine whether to employ the selected compression mode, or to reduce the level of compression by using a different compression mode. The receiving network device having received information about the selected compression mode, then employs that compression mode to decompress the received data.

21 Claims, 6 Drawing Sheets

U.S. PATENT DOCUMENTS

| | | | |
|---|---|---|---|
| 4,988,998 A | 1/1991 | O'Brien | |
| 5,003,307 A | 3/1991 | Whiting et al. | |
| 5,016,009 A | 5/1991 | Whiting et al. | |
| 5,109,433 A | 4/1992 | Notenboom | |
| 5,126,739 A | 6/1992 | Whiting et al. | |
| 5,146,221 A | 9/1992 | Whiting et al. | |
| 5,150,430 A | 9/1992 | Chu | |
| 5,155,484 A | 10/1992 | Chambers, IV | |
| 5,167,034 A | 11/1992 | MacLean, Jr. et al. | |
| 5,212,742 A | 5/1993 | Normile et al. | |
| 5,249,053 A | 9/1993 | Jain | |
| 5,276,898 A | 1/1994 | Kiel et al. | |
| 5,280,600 A | 1/1994 | Van Maren et al. | |
| 5,293,388 A | 3/1994 | Monroe et al. | |
| 5,333,212 A | 7/1994 | Ligtenberg | |
| 5,341,440 A | 8/1994 | Earl et al. | |
| 5,367,629 A | 11/1994 | Chu et al. | |
| 5,379,036 A | 1/1995 | Storer | |
| 5,410,671 A | 4/1995 | Elgamal et al. | |
| 5,414,425 A | 5/1995 | Whiting et al. | |
| 5,463,390 A | 10/1995 | Whiting et al. | |
| 5,479,587 A | 12/1995 | Campbell et al. | |
| 5,488,364 A | 1/1996 | Cole | |
| 5,488,483 A | 1/1996 | Murayama | |
| 5,504,842 A | 4/1996 | Gentile | |
| 5,506,944 A | 4/1996 | Gentile | |
| 5,539,865 A | 7/1996 | Gentile | |
| 5,542,031 A | 7/1996 | Douglass et al. | |
| 5,544,290 A | 8/1996 | Gentile | |
| 5,546,395 A | 8/1996 | Sharma et al. | |
| 5,546,475 A | 8/1996 | Bolle et al. | |
| 5,553,160 A | 9/1996 | Dawson | |
| 5,559,978 A | 9/1996 | Spilo | |
| 5,615,287 A | 3/1997 | Fu et al. | |
| 5,638,498 A | 6/1997 | Tyler et al. | |
| 5,646,946 A | 7/1997 | VanderMeer et al. | |
| 5,768,445 A | 6/1998 | Troeller et al. | |
| 5,768,525 A | 6/1998 | Kralowetz et al. | |
| 5,774,715 A | 6/1998 | Madany et al. | |
| 5,805,932 A | 9/1998 | Kawashima et al. | |
| 5,850,565 A | 12/1998 | Wightman et al. | |
| 5,874,907 A | 2/1999 | Craft | |
| 5,884,269 A | 3/1999 | Cellier et al. | |
| 5,892,847 A | 4/1999 | Johnson | |
| 5,909,250 A | 6/1999 | Hardiman | |
| 5,951,623 A | 9/1999 | Reynar et al. | |
| 5,991,515 A | 11/1999 | Fall et al. | |
| 6,070,179 A | 5/2000 | Craft | |
| 6,138,156 A | 10/2000 | Fletcher et al. | |
| 6,178,489 B1 | 1/2001 | Singh | |
| 6,314,095 B1 | 11/2001 | Loa | |
| 6,349,150 B1* | 2/2002 | Jones | 382/238 |
| 6,473,458 B1 | 10/2002 | Shimizu et al. | |
| 6,477,201 B1 | 11/2002 | Wine et al. | |
| 6,728,785 B1 | 4/2004 | Jungck | |
| 6,763,031 B1 | 7/2004 | Gibson et al. | |
| 6,775,235 B2 | 8/2004 | Datta et al. | |
| 6,879,631 B1 | 4/2005 | Schultz et al. | |
| 6,882,753 B2 | 4/2005 | Chen et al. | |
| 6,904,176 B1 | 6/2005 | Chui et al. | |
| 6,907,071 B2 | 6/2005 | Frojdh et al. | |
| 2002/0156946 A1* | 10/2002 | Masters et al. | 710/33 |
| 2004/0103215 A1 | 5/2004 | Ernst et al. | |
| 2005/0008017 A1 | 1/2005 | Datta et al. | |
| 2008/0025298 A1* | 1/2008 | Lev-Ran et al. | 370/389 |

FOREIGN PATENT DOCUMENTS

| | | |
|---|---|---|
| EP | 1 276 324 A1 | 1/2003 |
| EP | 1 424 779 A1 | 6/2004 |
| EP | 1 434 437 A2 | 6/2004 |
| WO | WO-00/07083 A1 | 2/2000 |
| WO | WO-01/71701 A2 | 9/2001 |
| WO | WO-03/073719 A1 | 9/2003 |
| WO | WO-2004/036501 A2 | 4/2004 |

OTHER PUBLICATIONS

Simpson, W. "The Point-To-Point Protocol (PPP)," RFC 1661, Jul. 1994, 54 pgs.

Schneider, K., et al. "PPP for Data Compression in Data Circuit-Terminating Equipment (DCE)," RFC 1976, Aug. 1996, 10 pgs.

Castineyra, I., et al. "The Nimrod Routing Architecture," RFC 1992, Aug. 1996, 27 pgs.

"Direct Access Storage Device Compression and Decompression Data Flow," IBM Technical Disclosure Bulletin, vol. 38, No. 11, Nov. 1995, pp. 291-295.

"Drive Image Professional for DOS, OS/2, and Windows," WSDC Dowload Guide, http://wsdcds01.watson.ibm.com/WSDC.nsf/Guides/Download/Applications-DriveImage.htm, accessed Nov. 22, 1999, 4 pgs.

"Drive Image Professional," WSDC Download Guide, http://wsdcds01.watson.ibm.com/wsdc.nsf/Guides/Download/Applications-DriveImage.htm, accessed May 3, 2001, 5 pgs.

Electronic Engineering Times, Issue 759, Aug. 16, 1993, 37 pgs.

ALDC1-5S—Adaptive Lossless Data Compression, IBM Microelectronics, May 1994. 2 pgs.

ALDC1-20S—Adaptive Lossless Data Compression, IBM Microelectronics, May 1994, 2 pgs.

ALDC1-40S—Adaptive Lossless Data Compression, IBM Microelectronics, May 1994, 2 pgs.

ALDC-MACRO—Adaptive Lossless Data Compression, IBM Microelectronics, May 1994, 2 pgs.

Craft, David J., "Data Compression Choice No Easy Call," Computer Technology Review, Jan. 1994, 2 pgs.

"Data Compression Applications and Innovations Workshop," Proceedings of a Workshop held in conjunction with the IEEE Data Compression Conference, Mar. 31, 1995, 123 pgs.

IBM Microelectronics Comdex Fall 1993 Booth Location, 1 pg.

"IBM Technology Products Introduces New Family of High-Performance Data Compression Products," IBM Coporation, Somers, NY, Aug. 16, 1993, 6 pgs.

Zebrose, Katherine L., "Integrating Hardware Acclerators into Internetworking Switches," Telco Systems, 10 pgs.

Readme, Powerquest Corporation, 6 pgs.

Costlow, Terry "Sony designs faster, denser tape drive," Electronic Engineering Times, May 20, 1996, 2 pgs.

Electronic Engineering Times, Issue 767, Oct. 11, 1993, 34 pgs.

"IBM Announces New Feature for 3480 Subsystem," Tucson Today, vol. 12, No. 337, Jul. 25, 1989, 1 pg.

Craft, D.J. "A fast hardware data compression algorithm and some algorithmic extensions," IBM Journal of Research and Development, vol. 42, No. 6, Nov. 1998, 14 pgs.

"Magstar and IBM 3590 High Performance Tape Subsystem Technical Guide," IBM, Nov. 1996, 288 pgs.

Gailly, J., "gzip The data compression program", Edition 1.2.4 for Gzip Version 1.2.4, pp. 1-13, Jul. 1993. Can be found at http://www.gnu.org/software/gzip/manual/html_mono/gzip.html.

"Gzip—Wikipedia, the free encyclopedia", Wikipedia, pp. 1-4, Dec. 6, 2005. Can be found at http://en.wikipedia.org/wiki/Gzip.

Gailly, J., "Invoking gzip", pp. 1-2, Jul. 1993. Can be found at http://www.math.utah.edu/docs/info/gzip_4.html#SEC7.

"Data compression—Wikipedia, the free encyclopedia", Wikipedia, pp. 1-7, Dec. 6, 2005. Can be found at http://en.wikipedia.org/wiki/Data_compression_algorithm.

Roelofs, Greg, zlib A Massively Spiffy Yet Delicately Unobtrusive Compression Library (Also Free, Not to Mention Unencumbered by Patents), pp. 1-5, Last updated on Aug. 7, 2005. Can be found at http://www.zlib.net/.

Krintz, Chandra and Sucu, Sezgin, "Adaptive on-the-Fly Compression (Abstract)", EEE Computer Society, vol. 17, No. 1, pp. 1-2, Jan. 2006. Can be found at http://csdl2.computer.org/persagen/DLAbsToc.jsp?resourcePath=/dl/trans/td/&toc=comp/trans/td/2006/01/l1toc.xml&DOI=10.1109/TPDS.2006.3.

Gailly, J. and Adler, M., "The gzip home page", pp. 1-8, Last updated Jul. 27, 2003. Can be found at http://www.gzip.org.

Gailly, J. and Adler, M., "zlib 1.1.4 Manual", pp. 1-14, Mar. 11, 2002. Can be found at http://www.zlib.net/manual.html.

Fielding, R., et al., "Hypertext Transfer Protocol—HTTP/1.1", IETF, RFC 2616, pp. 1-18, Jun. 1999.

Pierzchala, Stephen, "Compressing Web Content with mod_gzip and mod_deflate", Linux Journal, pp. 1-10, Apr. 26, 2004. Can be found at http://linuxjournal.com/article/6802.

"Data compression ratio—Wikipedia, the free encyclopedia", Wikipedia, pp. 1-2, Dec. 6, 2005. Can be found at http://en.wikipedia.org/wiki/Data_compression_ratio.

Deutsch, P., "GZIP file format specification version 4.3", IETF, RFC 1952, pp. 1-12, May 1996.

Deutsch, P. and Gailly, J., "ZLIB Compressed Data Format Specification version 3.3", IETF, RFC 1950, pp. 1-11, May 1996.

Deutsch, P., "DEFLATE Compressed Data Format Specification version 1.3", IETF, RFC 1951, pp. 1-17, May 1996.

Gailly, J., "Overview", pp. 1-2, Jul. 1993. Can be found at http://www.math.utah.edu/docs/info/gzip_2.html#SEC5.

Friend, R. and Monsour, R., "IP Payload Compression Using LZS", IETF, RFC 2395, pp. 1-9, Dec. 1998.

Heath, J. and Border, J., "IP Payload Compression Using ITU-T V.44 Packet Method", IETF, RFC 3051, pp. 1-8, Jan. 2001.

Seshan, Srinivasan, et al., "SPAND: Shared Passive Network Performance Discovery", USENIX Symposium on Internet Technologies and Systems, pp. 1-13, Dec. 1997.

"HTTP Compression", pp. 1-5, Last modified Jan. 17, 2006. Can be found at http://www.websiteoptimization.com/speed/tweak/compress/.

Pereira, R., "IP Payload Compression Using DEFLATE", IETF, RFC 2394, pp. 1-6, Dec. 1998.

Roelofs, Greg, et al., "zlib Frequently Asked Questions", pp. 1-7, last modified Jul. 18, 2005 by Mark Adler, © 1996-2005. Can be found at http://www.zlib.net/zlib_faq.html#faq38 <http://www.zlib.net/zlib_faq.html>.

"Transmission Control Protocol—DARPA Internet Program Protocol Specification", Sep. 1981, pp. 1-91, Information Sciences Institute, Marina del Rey, California, http://tools.ietf.org/html/rfc793 (accessed May 15, 2007).

"Amendment to Carrier Sense Multiple Access With Collision Detection (CSMA/CD) Access Method and Physical Layer Specifications—Aggregation of Multiple Link Segments", *IEEE Std 802.3ad-2000,*, Mar. 30, 2000, pp. 1-173.

Thaler, D. et al., "Multipath Issues in Unicast and Multicast Next-Hop Selection", *The Internet Society*, Nov. 2000, pp. 1-9.

Hopps, C., "Analysis of an Equal-Cost Multi-Path Algorithm", The Internet Society, Nov. 2000, pp. 1-8.

Moy, J. "OSPF Version 2", *The Internet Society*, Apr. 1998, pp. 1-53.

"AppCelera: Smart Compression". eWEEK.com, Ziff Davis Publishing Holdings Inc., Dec. 9, 2002, pp. 1-11, a 1996-2006. Can be found at http://www.eweek.com/article2/0,1759,755242,00.asp.

F5 Networks, Inc., "Configuration Guide for Local Traffic Management" Version 9.0, MAN-0122-01, Chapter 6, Sep. 7, 2004, pp. 1-26, a 1996-2005.

"HTTP Compression Speeds up the Web What is IETF Content-Encoding (or HTTP Compression)?", Revised Apr. 20, 2002, pp. 1-5. Can be found at http://webreference.com/internet/software/servers/http/compression/2.html.

Leurs, L., "Flate/deflate ompression", Dec. 20, 2000, pp. 1-2, a 2000. Can be found at http://prepressure.com/techno/compressionflate.htm.

Jeannot, Emmanuel, et al., "Adaptive Online Data Compression", 11th IEEE International Symposium on High Performance Distributed Computing, pp. 1-57, Sep. 2002.

Degermark, Mikael et al., "Low-Loss TCP/IP Header Compression for Wireless Networks," J.C. Baltzar AG, Science Publishers, Oct. 1997, pp. 375-387.

Adaptive Lossless Data Compression—ALDC, IBM, Jun. 15, 1994, 2 pgs.

\* cited by examiner

US 8,417,833 B1

METACODEC FOR OPTIMIZING NETWORK DATA COMPRESSION BASED ON COMPARISON OF WRITE AND READ RATES

TECHNICAL FIELD

The present invention relates generally to network communications, and more particularly, but not exclusively, to selectively compressing content based in part on managing compute and network resources.

BACKGROUND

The volume of information communicated over a network, such as the Internet, continues to grow. Data, images, and the like, are likely to remain the largest percentage of Internet traffic. Often, the issues of concern with Internet traffic range from business to consumer response and order times, to the time required to deliver business information to a traveler using a wireless device, to the time it takes to download rich media content such as music, videos, and so forth. Thus, it is not surprising, that a major compliant among Internet users is a lack of speed. One solution that is often proposed is to compress the data before it is sent over the network.

Compression is a process of seeking to encode information using fewer bits than an unencoded representation might use through the use of various compression algorithms. By compressing the data less data may be sent over the network, which may thereby reduce network bandwidth delays.

A number of compression algorithms are available today. For example, the Lempel-Ziv (LZ) compression methods are a set of well-known compression algorithms. DEFLATE is a variation on LZ, and is used in the PKZIP, gzip, and PNG compression algorithms. Lempel-Ziv-Welch (LZW), LZ-Renau (LZR) Lempel-Ziv-Oberhumer (LZO), and BZIP2 are other known compression algorithms. There exist many other compression algorithms as well.

While use of a compression algorithm may reduce the amount of data that is sent over a network, the compression algorithm may also consume computer resources that may in turn delay the sending of the data over the network. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
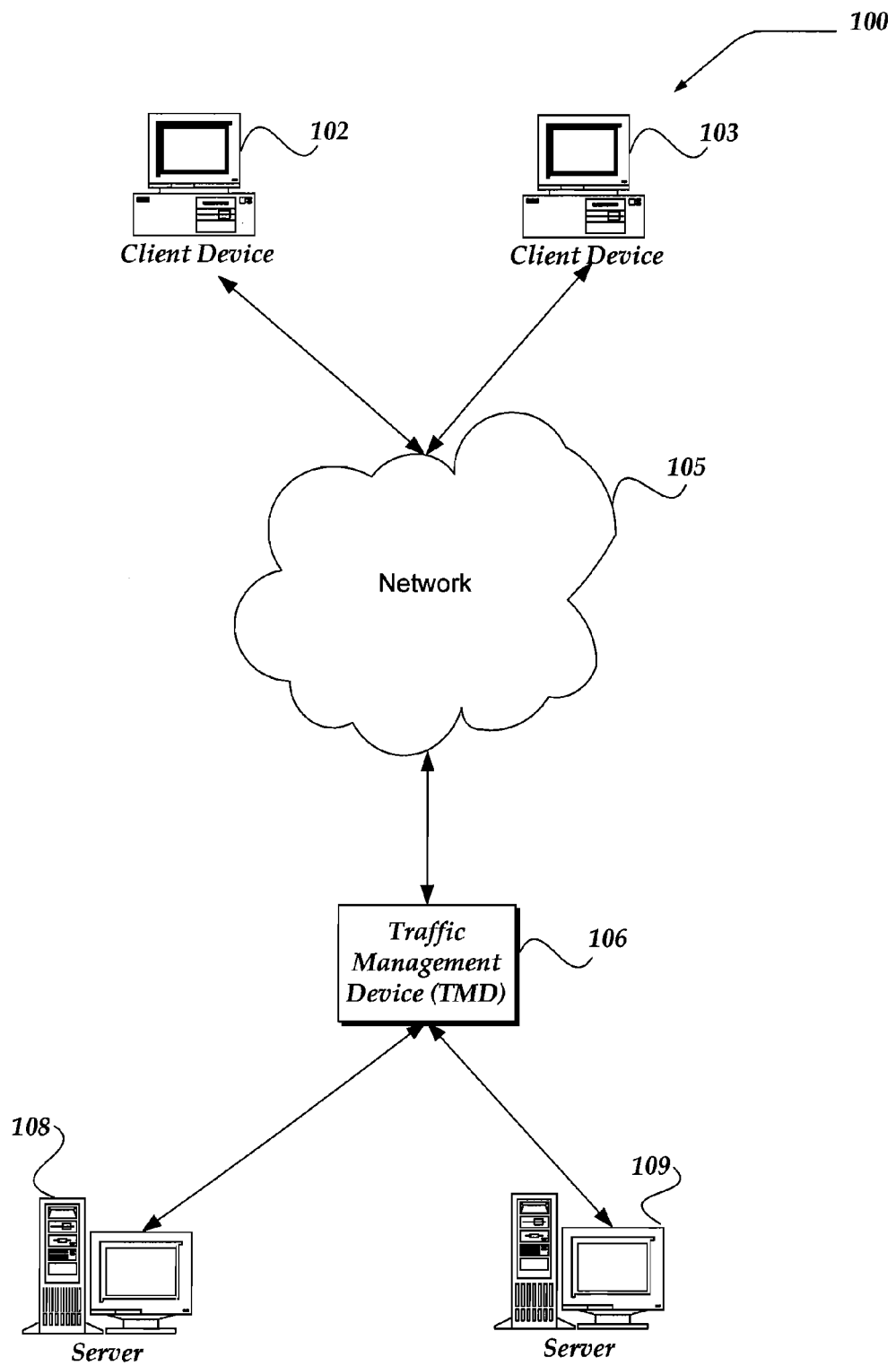
FIG. 1 shows a block diagram illustrating one embodiment of an environment for practicing the invention.

The invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods or devices. Accordingly, the invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term "network connection" refers to a collection of links and/or software elements that enable a computing device to communicate with another computing device over a network. One such network connection may be a TCP connection. TCP connections are virtual connections between two network nodes, and are typically established through a TCP handshake protocol. The TCP protocol is described in more detail in Request for Comments (RFC) 793, which is available through the Internet Engineering Task Force (IETF). A network connection "over" a particular path or link refers to a network connection that employs the specified path or link to establish and/or maintain a communication.

As used herein, the term "compression mode" refers to a combination of a compression algorithm and parameters or factors that distinguish the resulting compressed data. Some compression algorithms can be performed with one or more parameters that affect one or more of the speed at which the algorithm executes, an amount of memory used during compression, and/or a data compression ratio. For example, gzip-1 can be invoked with an optional parameter that indicates a relative speed that the compression algorithm is to be performed. As described, "gzip-1" generally executes at a higher speed than "gzip-9." Typically, although not always, a slower speed mode of gzip results in a higher compression ratio for the data. Each of the allowable speed designations and/or expected compression ratios may therefore considered being different compression modes as used herein. Moreover, increasing or decreasing a compression mode results in a selection of a compression mode with an expected slower speed/higher compression ratio or an expected faster speed/lower compression ratio, respectively. Reducing a compression mode employed therefore is directed towards selection of a compression mode with an expected faster speed/lower compression ratio than a currently employed compression mode.

Briefly, the embodiments of the invention are directed towards systems, machine-readable media, and methods for selectively compressing data for transmission over a network based on balancing compute and network resources. In one embodiment, a sending network device and a receiving network device may negotiate one or more different compression modes that may be employed to communicate data between them. Typically, the different compression modes range from high compression ratio output algorithms to low compression ratio output algorithms. Moreover, in one embodiment, an initial compression mode may be selected based on a network connection characteristic, such as a bandwidth of the network connection. In one embodiment, information about the selected compression mode is communicated to the receiving network device.

The sending network device then reads data that is to be transmitted over the network. In one embodiment, the data is read into an input buffer. In one embodiment, the data may be read from another network device. The sending network device may compress the read data using the selected compression mode. The compressed data may then be written out. In one embodiment, the compressed data is written to an output buffer that may be employed in communicating the compressed data over the network to the receiving network device.

A time consumed in performing the reading of the data, time consumed in performing the compression, and a time consumed in performing the write are determined. Ratios of the compress and the write times are then employed to selectively adjust the compression mode to be used for subsequent data compressions. In one embodiment, a detent mechanism is employed to minimize a likelihood of dithering between compression modes. In one embodiment, a compression ratio is also employed to determine whether to employ the selected compression mode, or to reduce the level of compression by using a different compression mode. The receiving network device having received information about the selected compression mode(s), then employs the compression mode(s) to decompress the received data.

In another embodiment, the compression ratio may be employed to determine whether the next received data is likely to be compressible. If it is determined that the compression ratio is low, indicating incompressibility of data, then a faster compression mode may be selected. For example, in one embodiment, the compression mode may selected may be LZ0, or the like.

Illustrative Operating Environment

FIG. 1 illustrates one embodiment of an environment in which the invention may operate. However, not all of these components may be required to practice the invention, and variations in the arrangement and type of the components may be made without departing from the scope of the invention.

As shown in the figure, system 100 includes client devices 102-103, network 105, traffic management device (TMD) 106, and server devices 108-109. Network 105 is in communication with and enables communication between client devices 102-103, and/or TMD 106. TMD 106 is in further communications with servers 108-109.

One embodiment of a client device is described in more detail below in conjunction with FIG. 3. Generally, however, client devices 102-103 may include virtually any network computing device capable of connecting to another computing device to send and receive information. The set of such network devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, radio frequency (RF) devices, infrared (IR) devices, integrated devices combining one or more of the preceding devices, or virtually any mobile device. Similarly, client devices 102-103 may be any device that is capable of connecting using a wired or wireless communication medium such as a PDA, POCKET PC, wearable computer, and any other device that is equipped to communicate over a wired and/or wireless communication medium.

Client devices 102-103 may further include a client application that is configured to manage various actions. For example, client devices 102-103 may also include a web browser application that is configured to enable an end-user to interact with other devices and applications over network 105.

Client devices 102-103 may communicate with network 105 employing a variety of network interfaces and associated communication protocols. Client devices 102-103 may, for example, use various dial-up mechanisms with a Serial Line IP (SLIP) protocol, Point-to-Point Protocol (PPP), and the like. As such, client devices 102-103 may transfer data at a low transfer rate, with potentially high latencies. For example, client devices 102-103 may transfer data at about 14.4 to about 46 kbps, or potentially more. In another embodiment, client devices 102-103 may employ a higher-speed cable, Digital Subscriber Line (DSL) modem, Integrated Services Digital Network (ISDN) interface, ISDN terminal adapter, or the like. As such, client devices 102-103 may be considered to transfer data using a high bandwidth interface varying from about 32 kbps to over about 622 Mbps, although such rates are highly variable, and may change with technology. Further, device 102 may transfer data at a different rate then client device 103.

Network 105 is configured to couple client devices 102-103, with other network devices, such as TMD 106, or the like. Network 105 is enabled to employ any form of computer readable media for communicating information from one electronic device to another. In one embodiment, network 105 may include the Internet, and may include local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 105 may further employ a plurality of wireless access technologies including, but not limited to, 2nd (2G), 3rd (3G) generation radio access for cellular systems, Wireless-LAN, Wireless Router (WR) mesh, and the like. Access technologies such as 2G, 3G, and future access networks may enable wide area coverage for network devices, such as client devices 102-103, or the like, with various degrees of mobility. For example, network 105 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like.

Furthermore, remote computers and other related electronic devices could be remotely connected to either LANs or WANs via a modem and temporary telephone link. In essence, network 105 includes any communication method by which information may travel between one network device and another network device.

Additionally, network 105 may include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as, but not limited to, twisted pair, coaxial cable, fiber optics, wave guides, and other wired media and wireless media such as, but not limited to, acoustic, RF, infrared, and other wireless media.

One embodiment of a server device that could be used as TMD 106 is described in more detail below in conjunction with FIG. 4. Briefly, however, TMD 106 includes virtually any network device that manages network traffic. Such devices include, for example, routers, proxies, firewalls, load balancers, cache devices, application accelerators, devices that perform network address translation, any combination of the preceding devices, or the like. TMD 106 may control, for example, the flow of data packets delivered to or forwarded from an array of server device devices, such as server devices 108-109. In one embodiment, messages sent between the TMD 106 and the server devices 108-109 may be over a secure channel, such as an SSL connection. Similarly, messages sent between TMD 106 and client devices 102-103 may also be over a secure channel. Moreover, messages between the TMD 106 and the server devices 108-109 and/or TMD 106 and client devices 102-103 or even between client devices 102-103 may be selectively compressed based, in part, on a compression to write time ratio as described in more detail below.

TMD 106 may direct a request for a resource to a particular one of server devices 108-109 based on network traffic, network topology, capacity of a server device, content requested, and a host of other traffic distribution mechanisms. TMD 106 may receive data packets from and transmit data packets to the Internet, an intranet, or a local area network accessible through another network. TMD 106 may recognize packets that are part of the same communication, flow, and/or stream and may perform special processing on such packets, such as directing them to the same server device so that state information is maintained. TMD 106 also may support a wide variety of network applications such as Web browsing, email, telephony, streaming multimedia and other traffic that is sent in packets. The BIG-IP® family of traffic managers, by F5 Networks Inc. of Seattle, Wash., are examples of TMDs. TMDs are described in more detail in U.S. Pat. No. 7,102,996 to Amdahl, et al. entitled "Method and System for Scaling Network Traffic Managers," which is incorporated herein by reference. In one embodiment, TMDs 105 may be integrated with one or more of server devices 108-109, and provide content or services in addition to the TMD functions described herein.

Further, TMD 106 may be implemented using one or more personal computers, server devices, multiprocessor systems, microprocessor-based or programmable consumer electronics, network PCs, radio frequency (RF) devices, infrared (IR) devices, integrated devices combining one or more of the preceding devices, and the like. Such devices may be implemented solely in hardware or in hardware and software. For example, such devices may include some application specific integrated circuits (ASICs) coupled to one or more microprocessors. The ASICs may be used to provide a high-speed switch fabric while the microprocessors may perform higher layer processing of packets.

TMD 106 may receive requests from client devices 102-103. TMD 106 may select one or more of the server devices 108-109 to forward the request. TMD 106 may employ any of a variety of criteria and mechanisms to select server devices 108-109, including those mentioned above, load balancing mechanisms, and the like. TMD 106 may receive a response to the request and forward the response to client devices 102-103.

Server devices 108-109 may include any computing device capable of communicating packets to another network device. Each packet may convey a piece of information. A packet may be sent for handshaking, i.e., to establish a connection or to acknowledge receipt of data. The packet may include information such as a request, a response, or the like. Generally, packets received by server devices 108-109 may be formatted according to TCP/IP, but they could also be formatted using another transport protocol, such as SCTP, UDP, NetBEUI, IPX/SPX, token ring, similar IPv4/6 protocols, and the like. Moreover, the packets may be communicated between server devices 108-109, TMD 106, and client devices 102-103 employing HTTP, HTTPS, RTSP, or any of a variety of current or later developed protocols.

In one embodiment, server devices 108-109 may be configured to operate as a website server. However, server devices 108-109 are not limited to web server devices, and may also operate a messaging server, a File Transfer Protocol (FTP) server, a database server, content server, and the like. Additionally, each of server devices 108-109 may be configured to perform a different operation. Thus, for example, server device 108 may be configured as a messaging server, while server device 109 may be configured as a database server. Moreover, while server devices 108-109 may operate as other than a website, they may still be enabled to receive an HTTP communication, an RTSP communication, as well as a variety of other communication protocols.

Devices that may operate as server devices 108-109 include personal computers, desktop computers, multiprocessor systems, microprocessor-based or programmable consumer electronics, network PCs, server devices, and the like.

In this specification, the term "client" refers to a computer's general role as a requester of data or services, and the term "server" refers to a computer's role as a provider of data or services. In general, it is possible that a computer can act as a client, requesting data or services in one transaction and act as a server, providing data or services in another transaction, thus changing its role from client to server or vice versa. Therefore, the invention is not to be construed as being constrained to a client/server architecture. For example, one embodiment might include a peer-to-peer architecture, or the like, without departing from the scope of the invention.

Moreover, any one of the network devices (e.g., client devices 102-103, TMD 106, or servers 108-109) may operate to selectively compress data before sending it to a receiving network device. Thus, for example, TMD 106 may read data from server 108, and selectively compress the read data based, in part, on compression time to write time ratios. TMD 106 may negotiate with client device 102 a compression mode useable to compress the data. TMD 106 may then write the compressed data out to a buffer that may be employed to transfer the compressed data over network 105 to client device 102. Client device 102 may then employ the compression mode to decompress the received data. Therefore, any one of the network devices may be a sending device that selectively compresses data, and/or a receiving device for selectively compressed data.

Figure 2:
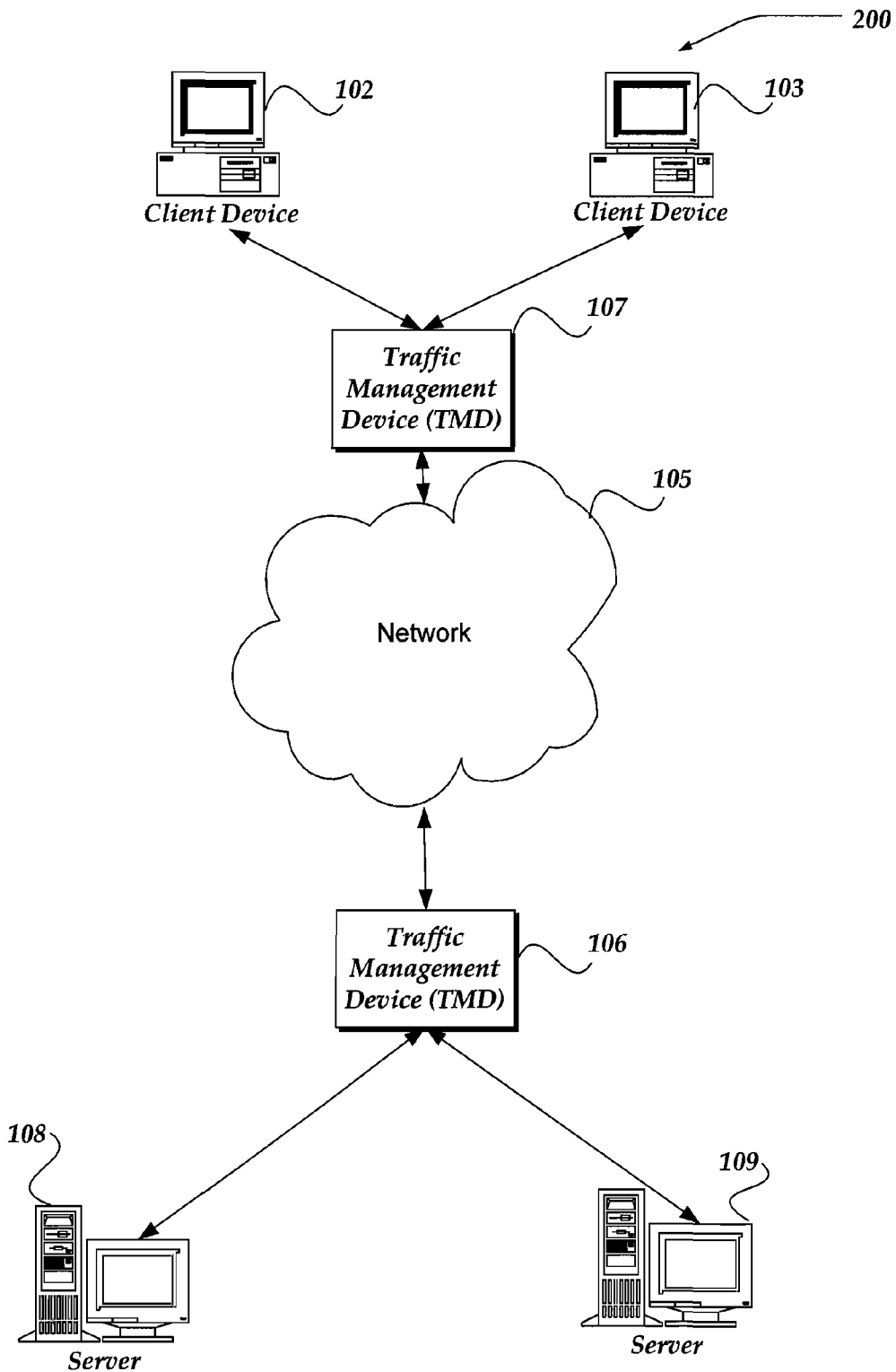
FIG. 2 shows a block diagram illustrating one embodiment of another environment for practicing the invention.

FIG. 2 illustrates one embodiment of another environment in which the invention may operate. As shown in the figure, system 200 includes client devices 102-103, network 105, traffic management device (TMD) 106, and server devices 108-109, each of which are substantially similar those described above in conjunction with FIG. 1. In addition, however, TMD 107 is inserted between client devices 102-103 and network 105. TMD 107 is configured to operate substantially similar to TMD 106 of FIG. 1. Thus, in system 200, compressed communications may be performed between TMDs 106-107, thereby removing a selective compression/decompression workload from client devices 102-103 and/or servers 108-109. However, system 200 does not preclude any of the network devices illustrated from also performing selective compression/decompression.

Illustrative Client Device

Figure 3:
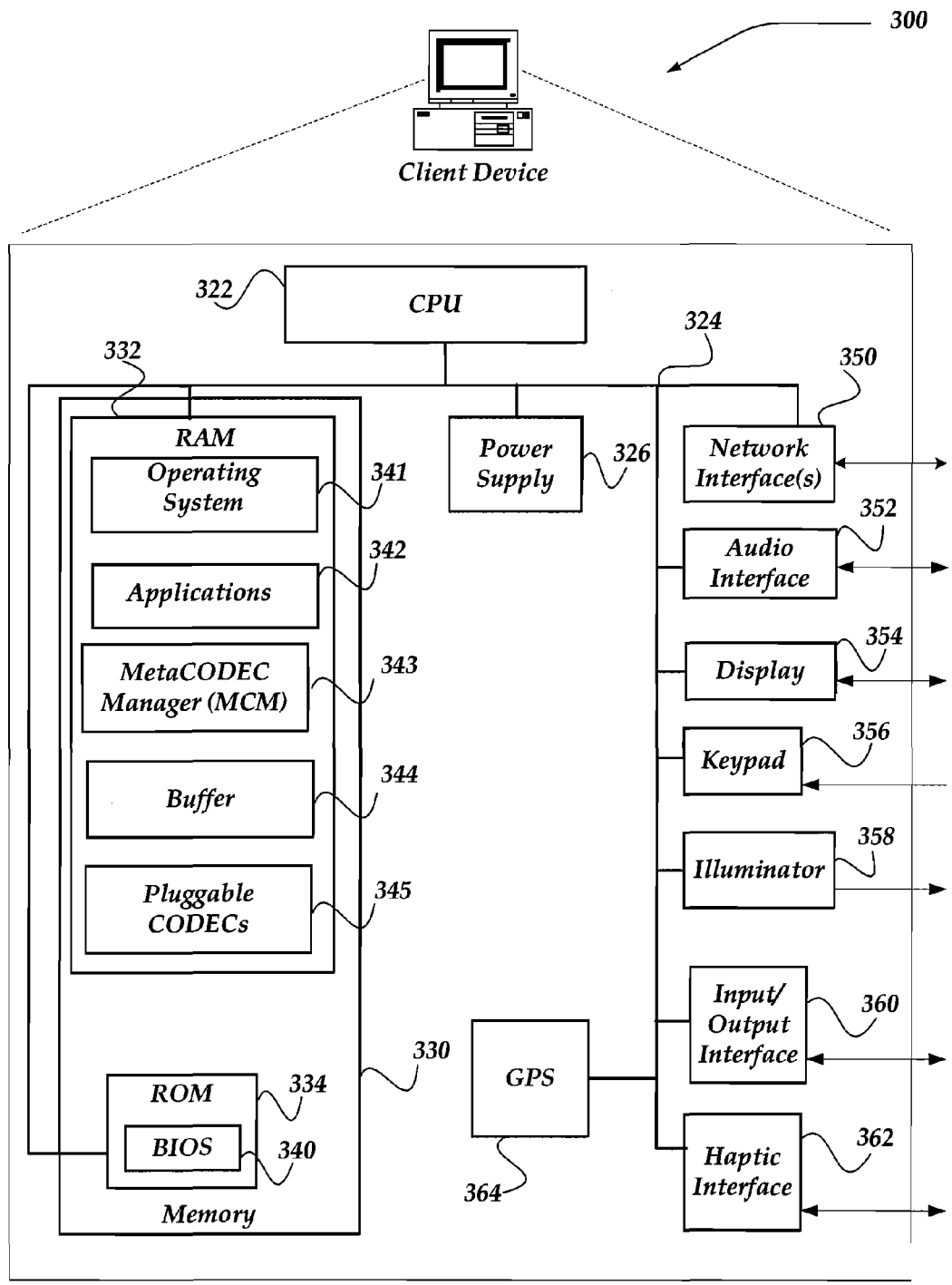
FIG. 3 illustrates one embodiment of a client device for managing content over a network.

FIG. 3 shows one embodiment of client device 300 that may be included in a system implementing the invention. Client device 300 may include many more or less components than those shown in FIG. 3. However, the components shown are sufficient to disclose an illustrative embodiment for practicing the present invention. Client device 300 may represent, for example, client devices 102-103 of FIGS. 1-2.

As shown in the figure, client device 300 includes a processing unit 322 in communication with a mass memory 330 via a bus 324. Client device 300 also includes a power supply 326, one or more network interfaces 350, an audio interface 352, a display 354, a keypad 356, an illuminator 358, an input/output interface 360, a haptic interface 362, and an optional global positioning systems (GPS) receiver 364. Power supply 326 provides power to client device 300. A rechargeable or non-rechargeable battery may be used to provide power. The power may also be provided by an external power source, such as an AC adapter or a powered docking cradle that supplements and/or recharges a battery.

Client device 300 may optionally communicate with a base station (not shown), or directly with another computing device. Network interface 350 includes circuitry for coupling client device 300 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or the like. Network interface 350 may further include a buffer for receiving data that is to be transmitted over a network, or for providing to one or more applications and/or operating system 341. Network interface 350 is sometimes known as a transceiver, transceiving device, or network interface card (NIC).

Audio interface 352 is arranged to produce and receive audio signals such as the sound of a human voice. For example, audio interface 352 may be coupled to a speaker and microphone (not shown) to enable telecommunication with others and/or generate an audio acknowledgement for some action. Display 354 may be a liquid crystal display (LCD), gas plasma, light emitting diode (LED), or any other type of display used with a computing device. Display 354 may also include a touch sensitive screen arranged to receive input from an object such as a stylus or a digit from a human hand.

Keypad 356 may comprise any input device arranged to receive input from a user. For example, keypad 356 may include a push button numeric dial, or a keyboard. Keypad 356 may also include command buttons that are associated with selecting and sending images. Illuminator 358 may provide a status indication and/or provide light. Illuminator 358 may remain active for specific periods of time or in response to events. For example, when illuminator 358 is active, it may backlight the buttons on keypad 356 and stay on while the client device is powered. Also, illuminator 358 may backlight these buttons in various patterns when particular actions are performed, such as dialing another client device. Illuminator 358 may also cause light sources positioned within a transparent or translucent case of the client device to illuminate in response to actions.

Client device 300 also comprises input/output interface 360 for communicating with external devices, such as a headset, or other input or output devices not shown in FIG. 3. Input/output interface 360 can utilize one or more communication technologies, such as USB, infrared, Bluetooth™, or the like. Haptic interface 362 is arranged to provide tactile feedback to a user of the client device. For example, the haptic interface may be employed to vibrate client device 300 in a particular way when another user of a computing device is calling.

Optional GPS transceiver 364 can determine the physical coordinates of client device 300 on the surface of the Earth, which typically outputs a location as latitude and longitude values. GPS transceiver 364 can also employ other geo-positioning mechanisms, including, but not limited to, triangulation, assisted GPS (AGPS), E-OTD, CI, SAI, ETA, BSS or the like, to further determine the physical location of client device 300 on the surface of the Earth. It is understood that under different conditions, GPS transceiver 364 can determine a physical location within millimeters for client device 300; and in other cases, the determined physical location may be less precise, such as within a meter or significantly greater distances.

Mass memory 330 includes a RAM 332, a ROM 334, and other storage means. Mass memory 330 illustrates another example of computer storage media for storage of information such as computer readable instructions, data structures, program modules or other data. Mass memory 330 stores a basic input/output system ("BIOS") 340 for controlling low-level operation of client device 300. The mass memory also stores an operating system 341 for controlling the operation of client device 300. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 330 further includes one or more buffer(s) 344, which can be utilized by client device 300 to store, among other things, applications 342 and/or other data. For example, buffer 344 may also be employed to store information that describes various capabilities of client device 300. The information may then be provided to another device based on any of a variety of events, including being sent as part of a header during a communication, sent upon request, or the like.

Applications 342 may include computer executable instructions which, when executed by client device 300, transmit, receive, and/or otherwise process messages (e.g., SMS, MMS, IM, email, and/or other messages), audio, video, and enable telecommunication with another user of another client device. Other examples of application programs include calendars, browsers, email clients, contact managers, task managers, transcoders, database programs, word processing programs, security applications, spreadsheet programs, games, and so forth. Additional applications may include MetaCODEC Manager (MCM) 343, and pluggable CODECs 345.

Pluggable CODECs 345 include virtually any of a variety of compression/decompression mode algorithms, including but not limited to LZ, DEFLATE, GZIP, PNG, LZW, LZR, LZO, BZIP2, or the like. Typically pluggable CODECs 345 include a plurality of different compression mode algorithms that may be selected to vary a compression ratio and/or speed of compression. Furthermore, pluggable CODECs 345 enable other CODECS, to be dynamically added and/or deleted.

MCM 343 is configured to perform selective compression upon data, and to further decompress received compressed data from another network device. MCM 343 may negotiate with the other network device to determine which of the compression modes within pluggable CODECs 345 may be employed to communicate compressed data between the at least the two devices over a network. In one embodiment, it may be determined that one or both of the devices is to obtain a CODEC not presently in their respective list of available CODECs.

Where client device 300 is determined to selectively compress data, MCM 343 may further select from one of the negotiated compresson modes, to initially use to compress data to be sent to the other network device. In one embodiment, MCM 343 may select the initial compression mode based on a characteristic of a network connection between the two communicating network devices. For example, MCM 343 may select the initial compression mode based on a bandwidth of the network connection, a Round Trip Time (RTT) for the network connection, or the network connection type. However, the invention is not constrained to these characteristics, and virtually any network connection characteristic may be used to select the initial compression mode from the negotiated compression modes. Moreover, in another embodiment, a characteristic of the data type to be compressed may also be used to select the initial compression mode. For example, if the data to be compressed is known to include an image, the compression mode might be selected from a variety of image compression algorithms.

MCM 343 may read data to be compressed, compress the data, and write the data out for transmission over a network. In one embodiment, times for the read, compress, and write activities are determined. The times may be determined based on any of a variety of mechanisms, including, monitoring a start time and an end time for each activity, monitoring CPU time consumed by each activity, or the like. Thus, the times may represent consumed resource time, elapsed clock time, or any of a variety of other forms of measuring time for each activity.

In one embodiment, the reading of data may represent reading of data from an input buffer, while the writing of the compressed data may represent writing to an output buffer, a TCP stack buffer, an operating system buffer, from user space to operating system space, a combination of the above, or the like.

In any event, based, in part, on a ratio of compress time and write time, a different compression mode may be selected to compress subsequent data. In one embodiment, MCM 343 may employ processes substantially similar to those described below in conjunction with FIGS. 5-6 to perform selective compression of the data.

Moreover, in one embodiment MCM 343 may operate to receive compressed data from another network device, such as TMD 106-107 of FIGS. 1-2, or the like. In such configuration, MCM 343 may operate to negotiate with the other network device, one or more compression modes, receive compressed data that employed at least one of the negotiated compression modes, and decompress the data.

Illustrative Network Device

Figure 4:
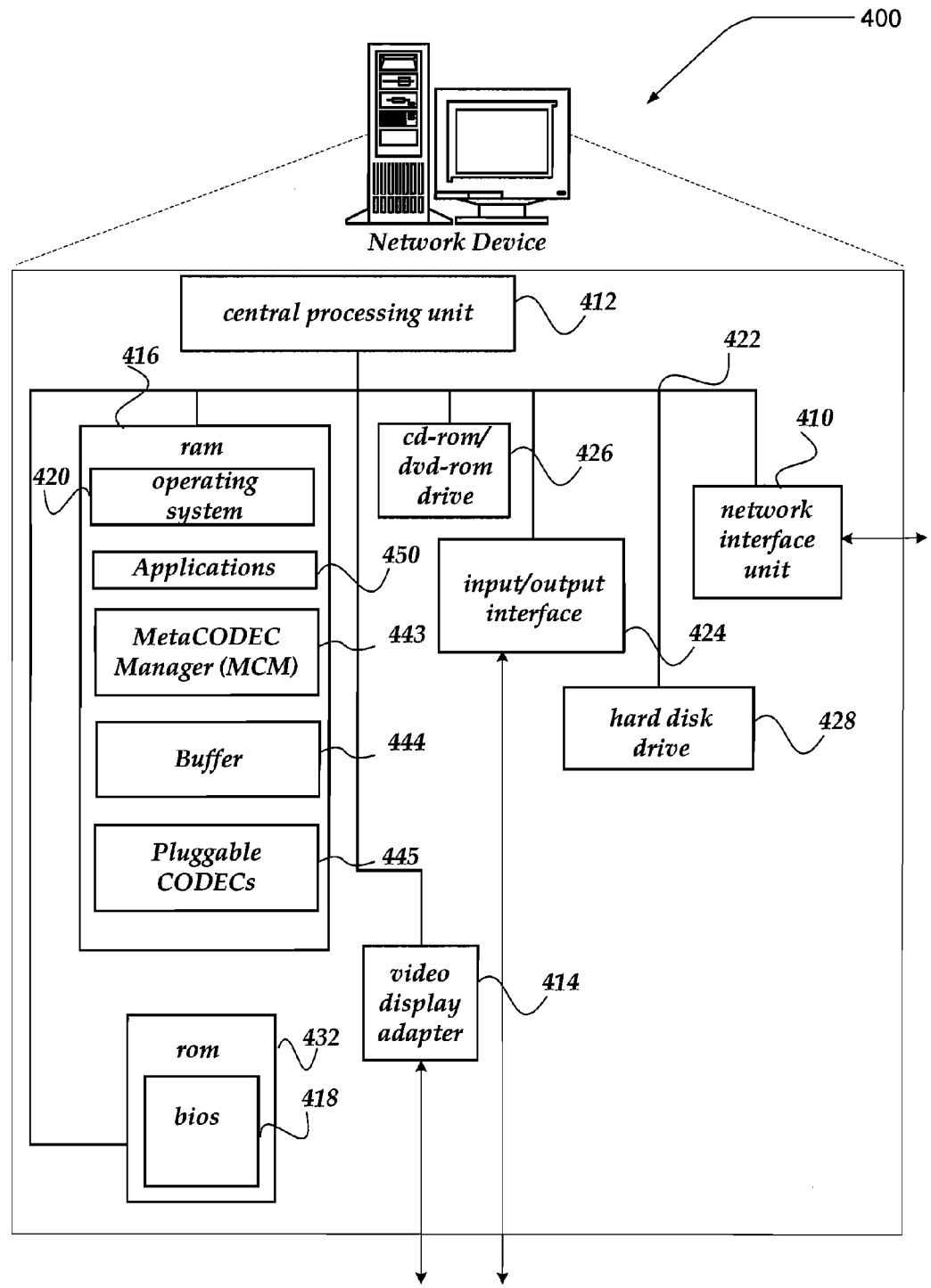
FIG. 4 illustrates one embodiment of a server device for managing content over a network.

FIG. 4 shows one embodiment of a network device, according to one embodiment of the invention. Server device 400 may include many more or less components than those shown. The components shown, however, are sufficient to disclose an illustrative embodiment for practicing one or more embodiments of the invention. Server device 400 may represent, for example, TMD 106-107 of FIGS. 1-2.

Server device 400 includes central processing unit (CPU) 412, video display adapter 414, and mass memory, all in communication with each other via bus 422. The mass memory generally includes RAM 416, ROM 432, and one or more permanent mass storage devices, such as hard disk drive 428, tape drive, optical drive, and/or floppy disk drive. The mass memory stores operating system 420 for controlling the operation of server device 400.

As illustrated in FIG. 4, server device 400 also can communicate with the Internet, or some other communications network via network interface unit 410, which is constructed for use with various communication protocols including the TCP/IP protocol. Network interface unit 410 is sometimes known as a transceiver, transceiving device, or network interface card (NIC).

The mass memory 416, 426, 428, 432 illustrates another type of computer-readable media, or machine-readable media, namely computer storage media. Computer storage media may include volatile, nonvolatile, removable, and non-removable media implemented in any method or technology for storage of information, such as computer readable instructions, data structures, program modules, or other data, which may be obtained and/or executed by CPU 412 to perform one or more actions. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory may also store other types of program code and data as applications 450, which may be are loaded into mass memory and run on operating system 420. Examples of application 450 may include email client/server programs, routing programs, schedulers, calendars, database programs, word processing programs, HTTP programs, RTSP programs, traffic management programs, security programs, and any other type of application program.

Server device 400 may also include an SMTP handler application for transmitting and receiving e-mail, an HTTP handler application for receiving and handing HTTP requests, a RTSP handler application for receiving and handing RTSP requests, and an HTTPS handler application for handling secure connections. The HTTPS handler application may initiate communication with an external application in a secure fashion. Moreover, server device 400 may further include applications that support virtually any secure connection, including TLS, TTLS, EAP, SSL, IPSec, and the like.

Moreover, one or more components of operating system 420 and/or applications 450 may be configured to determine a characteristic of a network connection. Such network characteristics include, but are not limited to a network bandwidth, a RTT, maximum segment size (MSS), bandwidth delay product (BWDP), a number of network failures, a number of retries for network packets, an amount of congestion on the network, or any of a variety of other characteristics.

One or more applications within application 450 may also be configured to examine data, network packets, or the like, to determine a type of data. Such types may include whether the data includes images, audio data, video data, text, HTTP, data, or the like. In one embodiment, one or more applications 450 may examine network packets at their application layer to determine a type of data. As used herein, application layer refers to layers 5 through 7 of the seven-layer protocol stack as defined by the ISO-OSI (International Standards Organization-Open Systems Interconnection) framework.

Server device 400 may also include input/output interface 424 for communicating with external devices, such as a mouse, keyboard, scanner, or other input/output devices not shown in FIG. 4. Likewise, server device 400 may further include additional mass storage facilities such as CD-ROM/DVD-ROM drive 426 and hard disk drive 428. Hard disk drive 428 may be utilized to store, among other things, application programs, databases, and the like in the same manner as the other mass memory components described above.

In one embodiment, the server device 400 may include at least one Application Specific Integrated Circuit (ASIC) chip (not shown) coupled to bus 422. The ASIC chip can include logic that performs some or all of the actions of server device 400. For example, in one embodiment, the ASIC chip can perform a number of packet processing functions for incoming and/or outgoing packets.

In one embodiment, server device 400 can further include one or more field-programmable gate arrays (FPGA) (not shown), instead of, or in addition to, the ASIC chip. A number of functions of server device 400 can be performed by the ASIC chip, the FPGA, by CPU 412 with instructions stored in memory, or by any combination of the ASIC chip, FPGA, and CPU.

Mass memory may also include MCM 443, buffer 444, and pluggable CODECs 445, which operate substantially similar to MCM 343, buffer 344, and pluggable CODECs 345 described above in conjunction with FIG. 3. Thus, for example, MCM 443 may be configured to read data that is to be selectively compressed based, in part, on a compression time to write time ratio. Moreover MCM 443 may also be configured to negotiate with another device for one or more compression modes for use in compressing data. MCM 443 may also be configured to receive compressed data and to employ one or more negotiated compression modes to decompress the data. MCM 443 may also be configured to employ processes substantially similar to those described below in conjunction with FIGS. 5-6 to perform at least some of its actions.

Generalized Operation

Figure 5:
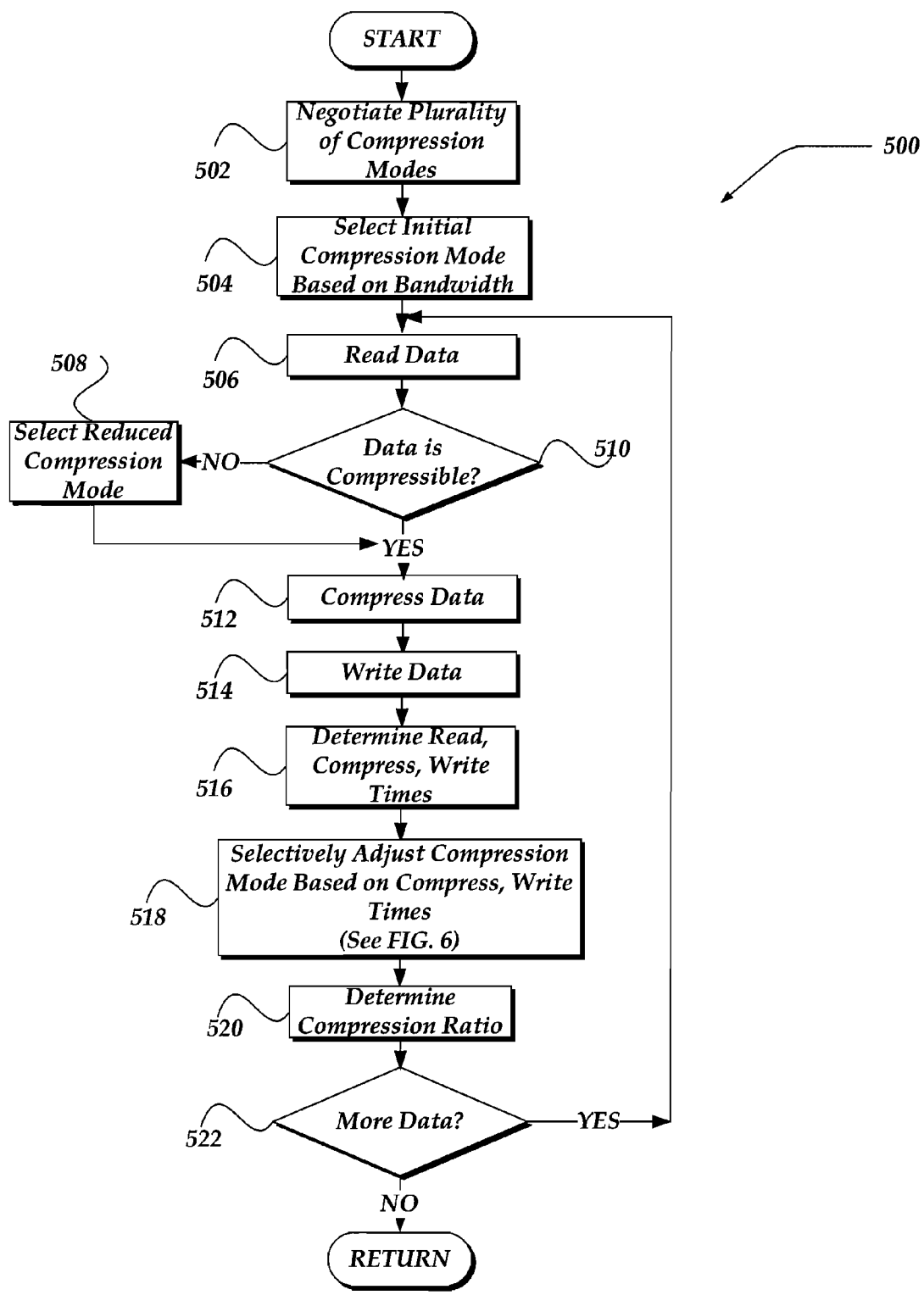
FIG. 5 illustrates a logical flow diagram generally showing one embodiment of a process for selectively compressing data for transmission over a network.

The operation of certain aspects of the invention will now be described with respect to FIG. 5. FIG. 5 illustrates a logical flow diagram generally showing one embodiment of a process for managing selectively compressing data for transmission over a network. Process 500 of FIG. 5 may be implemented in virtually any network device for use in selectively compressing data to be sent over a network. Thus, such sending network devices include, for example, TMDs 106-107 of FIGS. 1-2. Process 500 may also be implemented in client devices 102-103, and/or server devices 108-109 of FIGS. 1-2, without departing from the scope of the invention.

In any event, process 500 begins, after a start block, at block 502, where a negotiation of one or more (e.g., a plurality) compression modes is performed between the sending network device and a receiving network device. Thus, in one embodiment, a network connection between at least these two network devices may already be established using any of a variety of network communication protocols. Negotiation of the compression modes may include, for example, one or both of the network devices providing a list of compression modes that the network devices are presently configured to employ. The two network devices may then select from the intersection of the lists the one or more compression mode algorithms. In one embodiment, an update to one or both of the network devices may occur to obtain a compression mode. Moreover, negotiation of the compression modes, may involve identifying a set of associated pluggable CODECs, parameters, and/or other factors associated with the CODECs.

Processing then flows to block 504, where an initial compression mode is selected from the negotiated compression modes. In one embodiment, the initial compression mode may be selected based on a characteristic of the network connection, such as a bandwidth, or the like, including any of the characteristics described above. In another embodiment, the initial compression mode may also be selected based on a type of the data to be compressed. In yet another embodiment, the initial compression mode may also be set to a default compression mode.

Processing next moves to block 506 where data is read. In one embodiment, the data is read into an input buffer. In another embodiment, the data might be read from a network buffer into another buffer, into memory or the like.

Processing continues to decision block 510, where a determination is made whether the data is considered to be compressible. In one embodiment, such determination may be made based on previous read data. For example, a compression ratio for the previously read data may be used to determine whether the current data may be compressible. Compressibility may be based on the compression ratio being below some value. This value may be selected based on a variety of factors, including, but not limited to engineering judgment, statistics regarding the negotiated compression modes, or the like. Thus, for example, the determination may be that the current read data is incompressible if a determined compression ratio is below a value between 2-8% of compression (the data does not result in 'acceptable' compression). However, any other value may be selected, without departing from the scope of the invention. In any event if the current data is determined to be incompressible processing branches to block 508; otherwise, processing flows to block 512.

At block 508, a reduced compression mode may be selected. For example, a compression mode may be selected that is expected to result in a lower compression ratio with a faster computation time than the current compression mode. In one embodiment, the reduced compression mode selected could result in performing no compression. This might occur, for example, through an appropriate selection of factors, parameters, or the like, for a compression algorithm. For example, in one embodiment, the plurality of available compression modes may be examined to select a compression mode with a faster computation time (less compression). In one embodiment, the selected compression mode might be LZ0, or similar compression mode CODEC. Processing then flows to block 512.

At block 512, at least a first portion of the currently read data may be compressed using the selected compression mode. Processing flows to block 514, where the compressed data is written out. In one embodiment, the compressed data is written out to an output buffer. It should be noted that the operations of block 512 and 514 may occur iteratively, consecutively, or even almost simultaneously. Thus, in one embodiment, as data is compressed it may be written out to a buffer. In another embodiment, at least a first portion of the data may be compressed, written out, and then another portion of the data is compressed, and that portion may then be written out. In any event, processing then flows to block 516, where times are determined for reading the data, writing the data, and for compressing of the same data. As discussed above, the times may be determined based on a variety of conditions, events, or the like.

Processing flows next to block 518, which is described in more detail below in conjunction with FIG. 6. Briefly, however, at block 518, a compression time to write time ratio is employed to selectively adjust the compression mode used to compress subsequent data. In one embodiment, a detent counter may be employed to seek to minimize dithering between compression modes. Upon completion of block 518, a same or a different compression mode may have been selected for subsequent compressions.

Processing continues to block 520, where a compression ratio is determined based on number of bits read in and a number of bits written out (compressed bits). In a first iteration, in one embodiment, no compression mode may have been determined. In subsequent iterations, the compression mode may be updated based on historical data. For example, in one embodiment, a running average compression ratio may be employed for the data. For example, in one embodiment, a running average compression ratio might be computed as:

New compression ratio=(previous compression ratio+ current compression ratio)/2.

However, the invention is not limited to this equation and any of a variety of other computations may be employed to determine a compression ratio, including using an estimated compression ratio, or the like.

In another embodiment, different compression ratios may be determined for different data types. For example, where the data includes an image, one compression ratio may be determined. Where the data includes text, audio data, or the like, another compression ratio may be determined. Thus, in one embodiment, data type statistics may be obtained and employed to determine whether subsequently read data is likely to be compressible based on its data type and the collected statistics. In still another embodiment, different compression ratios may also be collected based on a variety of other criteria, including, but not limited to a connection type, a network port number, an application identifier, or the like.

In any event, the compression ratio determined at block 520, may be employed at decision block 510, in part, to determine whether currently read data may be compressible.

Processing next flows to decision block 522 where a determination is made whether there is more data to selectively compress. The additional data may include another portion of data associated with a file, document, image, text, webpage, or the like, that is to be communicated to the other network device. If there is more data to selectively compress, process loops back to block 506, to read at least another portion of the data, until no more data is to be selectively compressed. When it is determined that no more data is to be selectively compressed, processing may return to a calling process to perform other actions.

Figure 6:
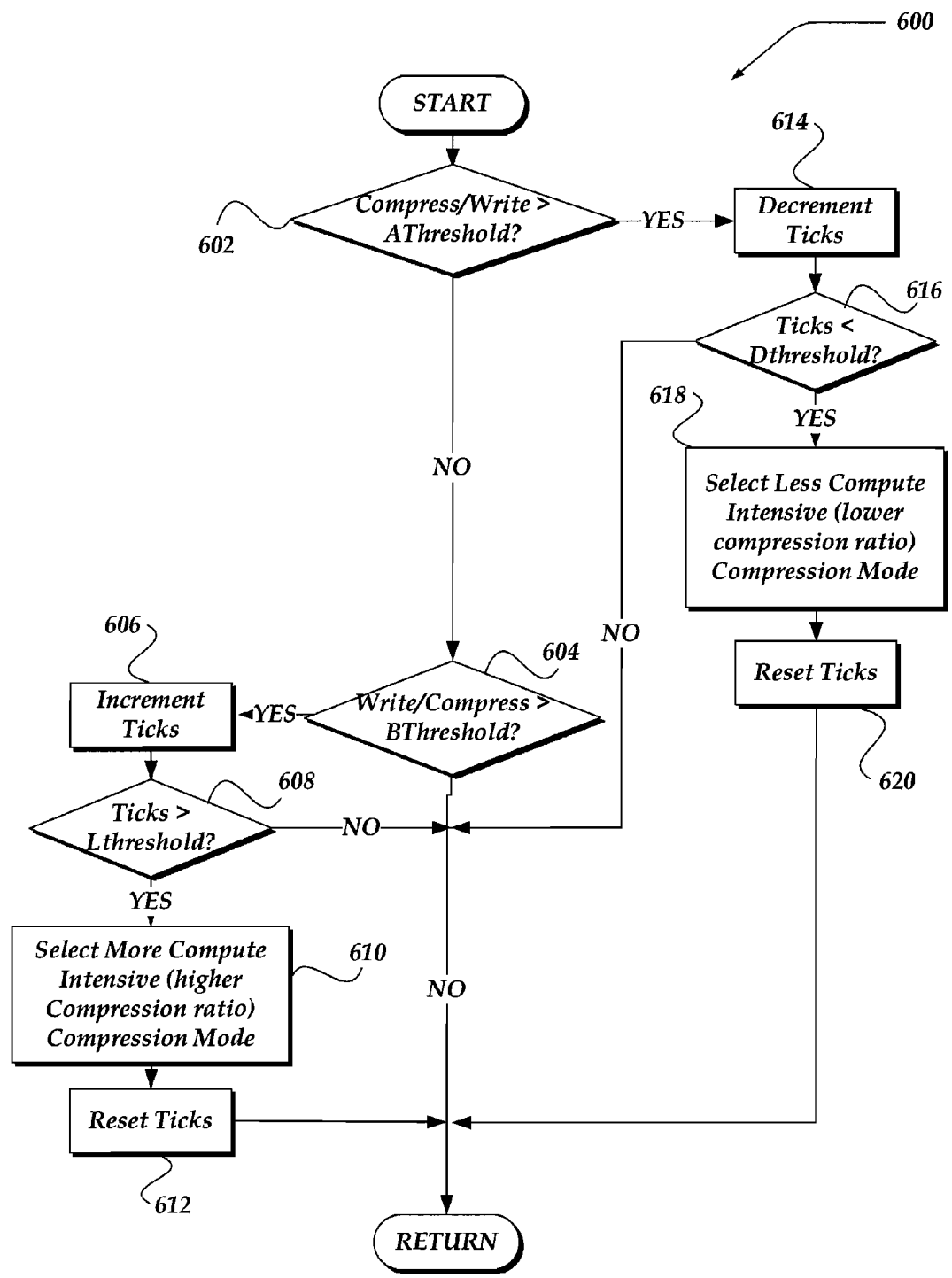
FIG. 6 illustrates a logical flow diagram showing one embodiment of a process for selecting different compression modes using a detent counter mechanism.

FIG. 6 illustrates a logical flow diagram showing one embodiment of a process for selecting different compression modes using a detent counter mechanism. Process 600 of FIG. 6 may be employed at block 518 of FIG. 5, for example.

Process 600 begins, after a start block, at decision block 602, where a determination is made whether a compression time over a write time is greater than a threshold (Athreshold). Setting of the threshold may be based on a variety of criteria. For example, in one embodiment, it may be desirable to have a ratio between the compression time and write time to be close to about 1.0. Thus, in one embodiment, embodiment, Athreshold may be set to 1.0. However, any of a variety of other values may be employed. For example, Athreshold may include a weighting factor, or based on engineering judgment, available statistics associated with negotiated compression modes, or the like, Athreshold might be set to something between about 0.9-1.2; however, other values may also be selected, without departing from the scope of the invention. In any event, if the compression time to write time ratio is above the threshold, processing branches to block 614; otherwise, processing flows to decision block 604.

At block 614, a tick value may be decremented. In one embodiment, the tick value may be decremented based on a weighted value. For example, in one embodiment, a weighting determined from a number of bits (or bytes) that were read might be used. Processing then flows to decision block 616 where a determination is made whether the tick value is less than another threshold (Dthreshold). Dthreshold may be set to any value to provide a detent. For example, in one embodiment, Dthreshold may be set to a value between −5 and −15. However, other values may be selected without departing from the invention. The detent is directed towards minimizing dithering between selections of compression modes. However, by setting Dthreshold to one, the detent may be effectively removed, if so desired. If the tick value is determined to be less than the other threshold, processing flows to block 618; otherwise processing returns to a calling process to perform other actions.

At block 618, a less compute intensive (lower compression ratio) compression mode is selected than that of the current compression mode. Such selection may be determined from the negotiated compression modes in FIG. 5. In one embodiment, the selected compression mode might result in zero compression of subsequent data. In any event, processing next flows to block 620, where the tick value may be reset to a zero baseline value. Processing then returns to the calling process to perform other actions.

At decision block 604, a determination is made whether a write time over a compression time is greater than a threshold (Bthreshold). Setting of the threshold may be based on a variety of criteria. For example, in one embodiment, it may be desirable to have a ratio between the compression time and write time to be close to about 1.0. Thus, in one embodiment, embodiment, Bthreshold may be set to 1.0. However, any of a variety of other values may be employed. For example, Bthreshold may include a weighting factor, or based on engineering judgment, available statistics associated with negotiated compression modes, or the like, Bthreshold might be set to something between about 0.9-1.2; however, other values may also be selected, without departing from the scope of the invention. Moreover, in one embodiment, Athreshold and Bthreshold may have different values. In another embodiment, they may have the same values. In any event, if the write time to compression time ratio is above the threshold, processing branches to block 606; otherwise, processing returns to the calling process to perform other actions.

At block 606 a tick value may be incremented. In one embodiment, the tick value may be incremented based on a weighted value. For example, in one embodiment, a weighting determined from a number of bits (or bytes) that were read might be used. Processing then flows to decision block 608 where a determination is made whether the tick value exceeds another threshold (Lthreshold). Lthreshold may be set to any value to provide a detent. For example, in one embodiment, Lthreshold may be set to a value between 5 and 15. However, other values may be selected without departing from the invention. Moreover, Lthreshold may be the same or different from Dthreshold. As noted above, setting of Lthreshold to one may effectively remove the detent, if so desired. In any event, if the tick value is determined to exceed the other threshold, processing flows to block 610; otherwise processing returns to a calling process to perform other actions.

At block 610, a more compute intensive (higher compression ratio) compression mode is selected than that of the current compression mode. Such selection may be determined from the negotiated compression modes in FIG. 5. In any event, processing then returns to the calling process to perform other actions.

It will be understood that each block of a flowchart illustration need not be limited in the ordering shown in the illustration, and may be performed in any ordering, or even performed concurrently, without departing from the spirit of the invention. It will also be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device that manages data over a network, comprising: a network communication component that sends or receives data over the network; and a processor that performs actions involving the data, including: reading the data; compressing the data using a compression mode; determining a compression time for compressing the data; writing the compressed data to a buffer for use in transmitting the compressed data over the network; determining a write time for writing the compressed data to the buffer; determining a ratio by dividing the compression time by the write time; and selectively modifying the compression mode based in part on the determined ratio of compression time divided by write, wherein selectively modifying the compression mode further comprises: if the ratio of compression time/write time is greater than a threshold value, selectively selecting another compression mode having a lower expected compression ration than a currently selected compression mode; and if a ratio of write time/compression time is greater than another threshold value, selectively selecting yet another compression mode having a higher expected compression ration than a currently selected compression mode.

2. The network device of claim 1, wherein the processor performs actions, further including: determining a compression ratio, in part, from a number of bits in the read data and a number of bits in the compressed data; reading another data; and if the compression ratio indicates that the data is incompressible, employing a reduced compression mode over a currently selected compression mode to attempt to compress the other data.

3. The network device of claim 2, wherein employing the reduced compression mode further comprises selecting a compression mode from a plurality of available compression modes with a fastest computation time.

4. The network device of claim 1, wherein selectively selecting another compression mode further comprises employing a detent counter to minimize dithering between compression modes.

5. The network device of claim 1, wherein the compression mode is selectable from a plurality of compression modes, each of the plurality being configured to provide a different expected compression ratios or expected execution times.

6. The network device of claim 1, wherein compressing the data using a compression mode further comprises selecting an initial compression mode based, in part, on a network bandwidth characteristic.

7. The network device of claim 1, wherein selectively modifying the compression mode further comprises negotiating with a receiving device at least one compression mode.

8. The network device of claim 1, wherein writing the compressed data to an output buffer further comprises, writing the compressed data to at least one of a TCP stack buffer, or a network card buffer.

9. A system configured to communicate data over a network, comprising:
  a first network device that is operative to perform actions, including:
    selecting a first compression mode from a plurality of compression modes;
    compressing a first portion of data using the first compression mode;
    determining a compression time for compressing the first portion of data;
    writing the compressed first portion of the data for use in transmitting the compressed first portion of the data over the network;
    determining a write time for writing the compressed first portion of data;
    determining a ratio by dividing the compression time by the write time;
    selectively selecting a second compression mode based in part on the determined compression time divided by write time ratio, wherein selectively selecting the second compression mode further comprises:

if the ratio of compression time/write time is greater than a threshold value, selectively reducing the first compression mode; and if a ratio of write time/compression time is greater than another threshold value, selectively increasing the first compression mode; and compressing a second portion of the data using the second compression mode; and a second network device that is operative to perform actions, including:

negotiating with the first network device the plurality of compression modes;

receiving the compressed data;

determining one of the plurality of compression modes used to compress the data; and decompressing the compressed data using the determined compression mode.

10. The system of claim 9, wherein the first network device is operative to perform actions, further comprising:

determining a compression ratio using a weighted running average of compression ratios over time; and employing the compression ratio to selectively select a reduced compression mode for another data.

11. The system of claim 9, wherein the second network device receives information about a compression mode employed to compress at least a portion of the data in data header of a network packet.

12. The system of claim 9, wherein selectively reducing or increasing the first compression mode further comprises employing a detent counter to minimize dithering between compression modes, the detent counter being further weighted based on a number of bits in the data to be compressed.

13. The system of claim 9, wherein the first network device is operative to perform actions, further comprising:

determining a compression ratio; and if the compression ratio indicates that the data is incompressible, selecting the second compression mode based, in part, as a fastest computation time compression mode from a plurality of available compression modes.

14. The system of claim 13, wherein the fastest computation time compression mode further comprises a compression mode with zero compression.

15. A method of managing content over a network, comprising:

compressing a first portion of data using a first compression mode;

determining a compression time for compressing the first portion of the data;

writing out the compressed first portion of the data to a buffer;

determining a write time for writing the compressed first portion of the data to the buffer;

determining a ratio by dividing the compression time by the write time; and selectively selecting a second compression mode based in part on the determined ratio and compressing a second portion of the data, wherein selectively selecting the second compression mode further comprises:

if the ratio of compression time/write time is greater than a threshold value, selectively reducing the first compression mode; and if a ratio of write time/compression time is greater than another threshold value, selectively increasing the first compression mode.

16. The method of claim 15, further comprising:

negotiating at least one compression mode; and selecting the first compression mode based, in part, on a network connection characteristic.

17. The method of claim 15, wherein selectively selecting a second compression mode further comprises:

if the ratio of compression time divided by write time is greater than the threshold value, incrementing a tick value, and if the tick value also exceeds yet another threshold value, selecting the second compression mode as having an expected lower compression ratio over that of the first compression mode.

18. The method of claim 15, wherein selectively selecting a second compression mode further comprises:

if a ratio of write time divided by compression time is greater than the other threshold value, incrementing a tick value, and if the tick value also exceeds yet another threshold value, selecting the second compression mode as having an expected higher compression ratio over that of the first compression mode.

19. The method of claim 15, wherein the tick value is further weighted by a number of bits in the first portion of uncompressed data.

20. A non-transitory, computer-readable storage medium that stores computer-executable program instructions when installed on a network device performs the method of claim 15.

21. A traffic management device (TMD) for enabling communications between network devices, comprising:

a transceiver for sending and receiving network packets; and a metacodec component operative to perform actions, including:

reading data from another computing device;

compressing the data using a first compression mode;

calculating a compression time for compressing the data;

writing the compressed data to a buffer for use in transmitting the compressed data over the network;

calculating a write time for writing the compressed data to the buffer;

determining a ratio by dividing the compression time by the write time;

selectively selecting a second compression mode based in part on the determined ratio of compression time to write time, wherein selectively selecting the second compression mode further comprises:

if the ratio of compression time/write time is greater than a threshold value, selectively reducing the first compression mode; and if a ratio of write time/compression time is greater than another threshold value, selectively increasing the first compression mode;

reading additional data from the other computing device; and employing the second compression mode to selectively compress the additional data.

* * * * *